United States Patent [19]

Rayburn

[11] Patent Number: 4,535,381
[45] Date of Patent: Aug. 13, 1985

[54] CAPACITIVE DEVICE AND METHOD OF PACKAGING THAT DEVICE

[75] Inventor: Charles C. Rayburn, Lynchburg, Va.

[73] Assignee: Illinois Tool Works Inc., Chicago, Ill.

[21] Appl. No.: 552,891

[22] Filed: Nov. 17, 1983

[51] Int. Cl.³ .................. H01G 1/13; H01G 4/10; B65D 65/00
[52] U.S. Cl. .................. 361/308; 206/497; 361/321
[58] Field of Search ............... 361/320, 321, 322, 306, 361/307, 308; 206/497

[56] References Cited

U.S. PATENT DOCUMENTS

| | | | |
|---|---|---|---|
| 2,128,990 | 9/1938 | Dubilier | 361/307 |
| 3,009,086 | 11/1961 | Rice et al. | 361/308 X |
| 3,134,059 | 5/1964 | Rayburn | 361/308 |
| 3,150,300 | 9/1964 | Schils et al. | 361/308 |
| 3,267,343 | 8/1966 | Rayburn | 361/308 |
| 4,071,880 | 1/1978 | Rutt | 361/321 X |

Primary Examiner—Donald A. Griffin
Attorney, Agent, or Firm—Donald D. Mondul; Thomas W. Buckman

[57] ABSTRACT

A capacitive device of the parallel plate type capacitor is disclosed with an improved system for packaging such devices. The devices disclosed have a plurality of strata of capacitive structures formed by alternating layers of dielectric material carrying metallic material thereon with successive layers of metallic material separated by dielectric material. Each layer of metallic material is electrically continuous substantially from the first end to a second end, a first group of the metallic layers is electrically continuous substantially from a first edge to a first continuity displaced from a second edge and a second group of metallic layers is electrically continuous substantially from a second edge to a second discontinuity displaced from the first edge; the first group alternates with the second group in the capacitive structure. The packaging system includes wrapping means, such as adhesive tape, for protecting the top, the first end, the bottom and the second end of the capacitive device; electrical leads connected to the exposed edges of the capacitive device; electrical leads connected to the exposed edges of the capacitive device by a plasma impact connection method; and impregnation of the device with a sealant such as wax. The invention provides substantially reduction in cost of manufacture, a significant reduction in volume occupied by the device, superior moisture resistance, improved dissapation factor of the capacitive device, and elimination of reflow of the electrical lead connections to the device during mounting of the device to an assembly such as a printed circuit board.

44 Claims, 4 Drawing Figures 4,535,381

CAPACITIVE DEVICE AND METHOD OF PACKAGING THAT DEVICE

BACKGROUND OF THE INVENTION

The present invention is directed to a capacitive device, specifically a capacitive device which is packaged in a unique manner providing certain advantages in its application such as significant reduction in volume occupied by the device, superior moisture resistance, improved dissapation factor, and elimination of reflow of the electrical connections to the device during mounting of the device to an assembly such as a printed circuit board.

SUMMARY OF THE INVENTION

The invention is a capacitive device formed in a solid shape generally that of a parallelepiped and having a plurality of strata of capacitive structure made up of a plurality of layers of dielectric film, each of which layers has attached thereto a metallic film. The layers are disposed in a manner providing separation of metallic film of each layer from metallic film of an adjacent layer by dielectric material. Layers of a first group have metallic film electrically communicative with a first edge of that layer but discontinuous electrically with respect to a second edge of that respective layer. Layers of a second group have each respective layer carrying a metallic film electrically communicative with the second edge of that respective layer but electrically discontinuous with respect to the first edge of that respective layer. Layers of the first group and the second group are alternated, thereby creating a plurality of strata of capacitive structure. The device of the present invention is protected by a protective wrapping which is contamination resistant and is applied to the device in a manner conforming to the contour of the device with sufficient strength to provide lateral support to the device and enhance the device's resistance to delamination. In the covering of the device by this protective wrapping the aforementioned edges with which the respective layers of metallic film electrically communicate are left accessible to facilitate electrical connection of leads to the device. The respective edges with which these metal films electrically communicate are coated with a porous metallic coating so that the metallic films of the first group of layers are electrically connected in common at the first edge of the device and the metallic film layers of the second group of layers are electrically connected in common at the second edge of the device. The electrical leads are attached by a plasma fusion process which provides tenacula of metal fibers within the porous metal coating at each of the edges and thereby provides a strong bond between the electrical leads and the capacitive device. The present invention additionally contemplates impregnation of the device with a sealant, such as wax, to displace air between the wrapping and the capacitive device as well as within the interstices of the capacitive device itself. Thus the dielectric constant of the device is improved since the wax has a higher dielectric constant that the air it has displaced; the wax serves additionally to coat the device thereby further enhancing its resistance to humidity and other contaminants.

The present invention addresses metallized film parallel plate capacitors. Metallized film parallel plate capacitors are presently packaged in a number of ways. For example, insertion within a plastic box and encapsulation within the box by epoxy or a similar material to ensure retention of the capacitor within the box as well as to enhance the pull away strength of the connection between the electrical leads and the capacitor structure and to environmentally protect the capacitor. Another common means of packaging metallized film parallel plate capacitors is to suspend the capacitors within an epoxy material and thereby to coat the entire capacitor and a small portion of its lead structure with an epoxy material. This packaging method also is designed to environmentally protect the capacitor as well as to enhance pull away strength of the electrical lead-to-capacitor bond. The electrical lead-to-capacitor bond is accomplished in such prior art devices as addressed above by providing a spray metal zinc-tin coating to interconnect alternate layers of metallized film and soldering the electrical leads to that zinc-tin coating. There are certain problems attendant to such a lead connection process, chief among which is the problem of possible reflow of the electrical lead-to-capacitor bond caused by the heat generated on the electrical leads during the process of attaching the leads to an assembly such as a printed circuit board. Such reflow serves to weaken the physical electrical lead-to-capacitor bond and thereby perhaps even alter the electrical quality of the bond as well.

Further, the epoxy and similar materials used to encapsulate capacitors presently are not impervious to moisture or other contaminants and incursion of moisture or other contaminants may occur, thereby altering, perhaps significantly, the electrical characteristics of the encapsulated device.

It is therefore an object of this invention to provide a capacitive device significantly reduced in volume occupied by the device in electrical environments.

It is a further object of this invention to provide a capacitive device with improved moisture resistance.

It is a still further object of this invention to provide a capactive device with improved dissipation factor and which device is capable of being mounted to an assembly such as a printed circuit board without experiencing reflow of the electrical lead-to-capacitor bond.

It is yet a further object of this invention to provide a capacitive device of significantly reduced cost of manufacture.

Further objects and features of the present invention will be apparent from the following specification and claims when considered in connection with the accompanying drawings illustrating the preferred embodiment of the invention.

DETAILED DESCRIPTION OF THE DRAWINGS

DETAILED DESCRIPTION OF THE INVENTION

Figure 1:
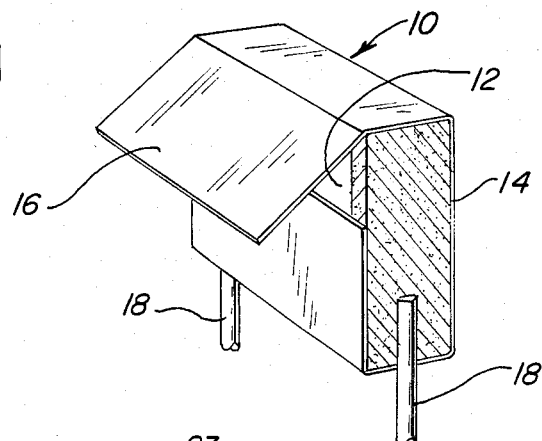
FIG. 1 is a perspective drawing of the capacitive device prior to application of sealant material, with tape partially pulled away to illustrate wrapping of tape about the device according to the preferred embodiment of the present invention.

A capacitive device 10 is shown in FIG. 1 comprising a plurality of capacitive structures 12 coated at each end with a porous metal conductive material 14 and wrapped with a wrapping means such as adhesive tape 16 to provide additional physical strength to the capacitive device 10 in order that the capacitive device 10 may better resist delamination of its plurality of capacitive strata 12 and, further, to enhance resistance of the capacitive device 10 to incursions of humidity and other contaminants. Of course, other wrapping materials, such as heat shrinkable material, could be used in lieu of tape. In such an embodiment of the present invention, the heat shrinkable material is applied to the capacitive device 10 and subjected to heat to form a sleeve about the capacitive device 10 and conforming to the shape thereof. Electrical leads 18 are attached to the capacitive device 10 by fusion with the porous metal conductive material 14 through a process to be described in more detail hereinafter.

An alternative embodiment of the present invention incorporates thermally insulative tape (or heat shrinkable material which is heat insulative at processing temperatures to which the capacitive device 10 is subjected during mounting to an assembly) is used as wrapping material, thereby allowing the electrical leads 18 to be omitted and enabling mounting of the capacitive device 10 in leadless fashion.

The present invention is designed to provide a capacitive device which will be competitive both in terms of price as well as in terms of electrical performance in today's marketplace wherein capacitive devices of the type contemplated by this invention (i.e. metallized film parallel plate capacitors) have become essentially commodity items and, as such, extremely price competitive. It is essential that a producer of capacitive devices desiring to remain commercially competitive be able to reduce his cost of manufacture as much as possible without reducing the electrical performance of the devices. The present invention fulfills both of those essentials of the marketplace; in fact, the electrical performance of this device is enhanced while its cost of manufacture is significantly reduced. Prior art devices involve a plurality of capacitive strata with spray metal porous conductive material applied to the ends of the capacitor to electrically connect alternate layers of capacitive structure, and attachment of leads to each end through the porous metal conductive material with a final step of encapsulation of the device in some manner. One common means of encapsulation in today's marketplace is insertion of the capacitive device into a plastic box and filling the plastic box with epoxy or a similar material. Another common means of encapsulation is to dip the capacitive device in epoxy or similar material and thereby coat the capacitive device and a portion of its lead structure with the material. Prior art devices also the use a zinc-pin porous metal conductive material on the edges of the device for electrical commonality of alternating layers producing the capacitive relationship within the device in order to facilitate soldering of electrical leads to the zinc-tin material. Two disadvantages of this soldering means of attachment are that, first, the bond is physically not as strong as is desired; and, second, the electrical lead-to-capacitor bond may be subject to reflow caused by heat conducted by the electrical leads to the joint during attachment of the electrical leads within an electrical assembly, such as a printed circuit board. The present invention overcomes both of these problems as will be explained in more detail hereinafter.

Figure 2:
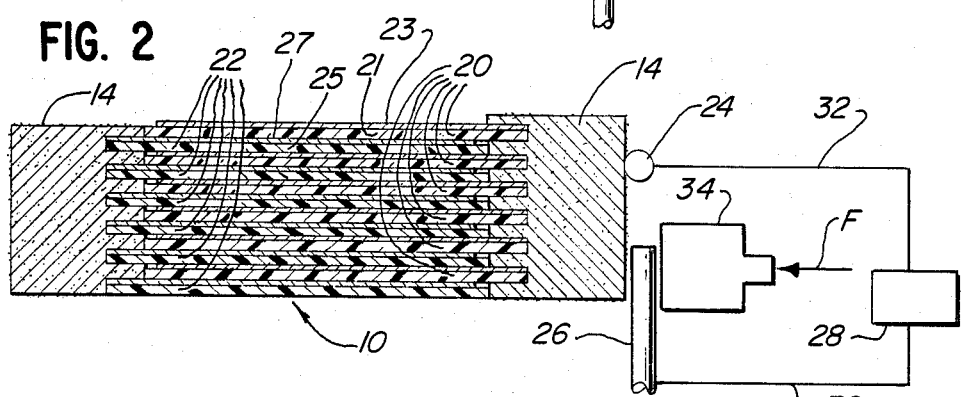
FIG. 2 is a schematic drawing representing the capacitive device in transverse section and illustrating initial set up for attachment of an electrical lead to the capacitive device according to the preferred embodiment of the present invention.

FIG. 2 illustrates, schematically, initial set up for plasma fusion of electrical leads to a capacitive device according to the preferred embodiment of the present invention. In FIG. 2 a capacitive device 10 is shown schematically in transverse section revealing alternating plates of a first group of plates 20, each of which plates has a layer of dielectric material 21 with metallic film 23 attached thereto and a second group of plates 22 of similarly formed layers of dielectric material 25 and attached metallic film 27 structure. As is shown in FIG. 2 the first group of plates 20 alternates with the second group of plates 22 with each respective group 20, 22 being aligned within itself yet as a group offset from the other group so that, in FIG. 2, the first group of plates 20 is electrically connected in common by a porous metal conductive material 14 and at the left side of FIG. 2 the second group of plates 22 is electrically connected in common by porous metal conductive material 14. (For purposes of clarity, similar elements will receive similar reference numerals throughout the various figures.) Continuing to refer to FIG. 2, a first electrical lead 24 is placed in electrical contact with the porous metal conductive material 14 at one end of the capacitor device 10. A second electrical terminal 26, which electrical terminal 26 will ultimately form one of the electrical leads 18 of FIG. 1, is suspended adjacent the porous metal conductive material 14. Electrical circuitry 28 is used to apply a potential difference between the first electrical lead 24 and the second electrical lead 26 by connections 30 and 32. Electrical circuit 28 is of the type well known in the art providing for charging of capacitors in order that a large potential may be maintained across its connections 30 and 32 without necessitating power supply requirements beyond those normally found in an industrial environment. Suspended adjacent the second electrical terminal 26 is a plunger mechanism 34 to which a force F will be applied as hereinafter described.

Figure 3:
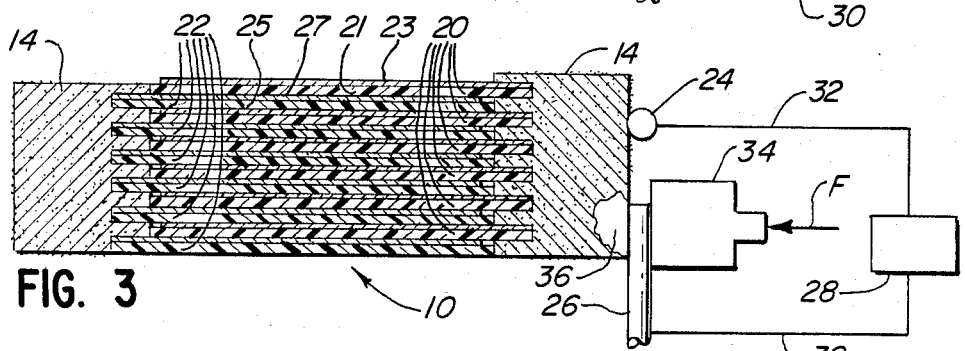
FIG. 3 is a schematic drawing similar to FIG. 2 illustrating the initial phase of attachment of an electrical lead to the capacitive device according to the preferred embodiment of the present invention.

Referring now to FIG. 3, a subsequent step in attachment of the lead 26 to the porous metal conductive material 14 is shown. At this point the force F has been applied to the plunger mechanism 34 to drive the second electrical terminal 26 against the porous metal conductive material 14, thereby completing an electrical circuit between the second electrical terminal 26 and the first electrical terminal 24 through the porous metal conductive material 14. The potential produced by the electrical circuit 28 in the preferred embodiment of the invention is sufficient, in combination with the amount of force F applied to the plunger mechanism 34 and the resultant impact of the second electrical terminal 26 against the porous metal conductive material 14, to form a plasma 36 within the porous metal conductive material 14 in the vicinity of the second electrical terminal 26. Force F continues to be applied to the plunger mechanism 34 to maintain physical and electrical contact between the second electrical terminal 26 and the porous metal conductive material 14 with the result that, with the presence of the plasma 36 in the vicinity of the second electrical terminal 26, the force F, through the plunger mechanism 34, drives the second electrical terminal 26 into the plasma 36 of the porous metal conductive material 14.

Figure 4:
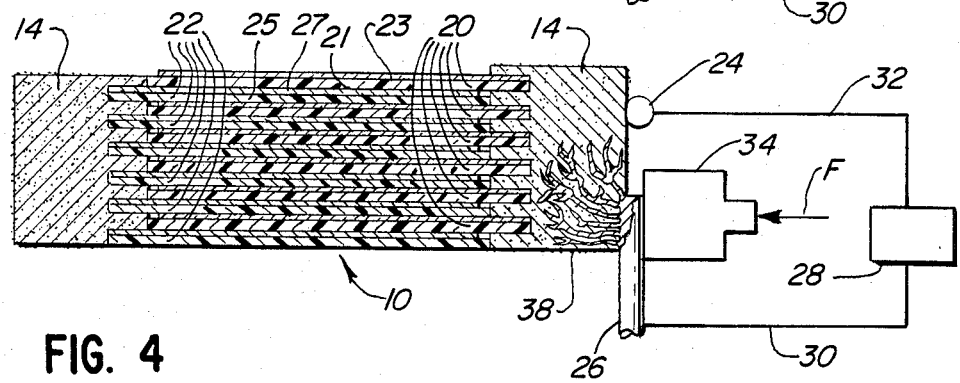
FIG. 4 is a schematic drawing similar to FIGS. 2 and 3 illustrating the final phase of the process of attachment of electrical leads to the capacitive device according to the preferred embodiment of the present invention.

As shown in FIG. 4, which figure depicts the final phase of lead attachment according to the preferred embodiment of the present invention, the force F, through the plunger mechanism 34, drives the second electrical terminal 26 into the porous metal conductive material 14 a distance approximately equal to one-half the diameter of the second electrical terminal 26. As the second electrical terminal 26 is driven into the porous metal conductive material 14, the plasma 36 begins to cool and revert to pure metal fibers as at 38 in FIG. 4. FIG. 4 illustrates the final result of the lead attachment process of the present invention. This final result is particularly advantageous in that the pure metal fibers 38 are in the form of tenacula embedded within the porous metal conductive material 14 and provide an extremely strong physical as well as electrical bond between the second electrical terminal 26 and the capacitive device 10 through the porous metal conductive material 14.

The same procedure as above described for lead attachment is applied to the remaining side of the capacitive device 10, and, in subsequent processing, a sealant is introduced by way of vacuum impregnation both within the interstices of the capacitive device 10 as well as between the capacitive device 10 and the tape or other wrapper 16. A common sealant used for such a purpose is wax. Since wax has a higher dielectric constant than the air it is displacing from the interstices of the capacitive device 10 the dielectric constant of the capacitive device 10 will be improved by this impregnation process. Moreover, the wax used in the preferred embodiment of the present invention is extremely successful at preventing incursions of moisture in humid conditions, a common problem among capacitive devices of the prior art type described above.

The preferred embodiment of the present invention employs a single-metal porous metal conductive material 14 in order that bi-metal reaction enhancement of oxidation will be eliminated; aluminum has been found to be particularly successful in this application. Since aluminum has a significantly higher melting point than common zinc-tin materials used as connecting material for prior art capacitors, the problem of reflow during subsequent soldering operations in attaching the capacitor within a subassembly, such as a printed circuit board, is obviated. The inducement of a plasma through the application of high potential across the first electrical terminal 24 and the second electrical terminal 26 as well as the impact of the plunger means 34 against the second electrical terminal 26 in driving the second terminal 26 against the porous metal conductive material 14 results in an extremely fast process, sufficiently fast to insure an excellent physical and electrical bond between the electrical terminal 26 and the capacitive device 10 through the porous metal conductive material 14, without any heat damage such as melting or vaporization of the metallized films 23, 27 carried upon the dielectric substrates 21, 25 within the capacitive device 10, which metallized films 23, 27 actually form the capacitor plates of the capacitive device 10. Generally, the fusion process described above for electrical lead attachment occurs in an elasped time on the order of one millisecond.

It is to be understood that, while the detailed drawings and specific examples given described preferred embodiments of the invention, they are for the purpose of illustration only, that the apparatus of the invention is not limited to the precise details and conditions disclosed and that various changes may be made therein without departing from the spirit of the invention which is defined by the following claims.

I claim:

1. A capacitive device formed in a solid shape having a length defined by a first end and a second end, a width defined by a first edge and a second edge and a height defined by a top and a bottom, said capacitive device comprising a plurality of strata of capacitive structure, a protective means and electrical connection means; said plurality of strata of capacitive structure comprising a plurality of layers of dielectric film, each of said plurality of layers of dielectric material having affixed thereto a metallic film, said plurality of layers being disposed with said metallic film of each layer being separated by dielectric material from said metallic film of an adjacent layer, each of said plurality of layers having metal film extending substantially from said first end to said second end and having said metal film electrically discontinuous at a discontinuity between said first edge and said second edge; said protective means comprising wrapping means covering said top, said first end, said bottom and said second end; said electrical connection means comprising an electrically conductive coating applied to said first edge and said second edge to electrically connect said metallic films of each of said plurality of layers, and said wrapping means being applied sufficiently tightly to the device to mechanically enhance the device, thereby increasing capability of the device to resist delamination.

2. A capacitive device as recited in claim 1 wherein a first group of said plurality of layers has said discontinuity located at a first distance from said first edge and a second group of said plurality of layers has said discontinuity located at a second distance from said first edge, said first distance and said second distance being unequal; layers of said first group alternating with layers of said second group.

3. A capacitive device as recited in claim 2 wherein said wrapping means comprises tape.

4. A capacitive device as recited in claim 3 wherein said electrically conductive coating comprises a porous metal coating and said electrical connection means further comprises electrical lead means attached to said porous metal coating in a manner providing tenacula of metal fibers embedded within said porous metal coating and fused to said lead means, thereby providing an extremely strong bond between said lead means and the device.

5. A capacitive device as recited in claim 4 wherein said protective means further comprises sealing means, said sealing means being introduced within the device to displace fluid contaminants from the device, introduced between the device and said tape, and introduced upon exposed surfaces of the device to seal the device against incursions by humidity or other contaminants.

6. A capacitive device as recited in claim 2 wherein said electrically conductive coating comprises a porous metal coating and said electrical connection means further comprises electrical lead means attached to said porous metal coating in a manner providing tenacula of metal fibers embedded within said porous metal coating and fused to said lead means, thereby providing an extremely strong bond between said lead means and the device.

7. A capacitive device as recited in claim 6 wherein said protective means further comprises sealing means, said sealing means being introduced within the device to displace fluid contaminants from the device, introduced between the device and said heat shrinkable material, and introduced upon exposed surfaces of the device to seal the device against incursions by humidity or other contaminants.

8. An improved system for packaging parallel plate capacitive devices having a length defined by a first end and a second end, a height defined by a top and a bottom and a width defined by a first edge and a second edge, said capacitive devices further having a plurality of strata of capacitive structures formed by alternating layers of dielectric material carrying metallic material thereon with successive layers of metallic material separated by dielectric material, each layer of metallic material being electrically continuous substantially from said first end to said second end, a first group of said metallic layers being electrically continuous substantially from said first edge to a first discontinuity displaced from said second edge, and a second group of said metallic layers being electrically continuous substantially from said second edge to a second discontinuity displaced from said first edge, said first group alternating with said second group; the improvement comprising wrapping means for protecting said top, said first end, said bottom and said second end; electrical connection means for providing electrical connection to said first group of metallic layers at said first edge and separate electrical connection to said second group of metallic layers at said second edge, said wrapping means being applied sufficiently tightly to the device to mechanically enhance the device, thereby increasing capability of the device to resist delamination.

9. An improved system for packaging parallel plate capacitive devices as recited in claim 8 wherein said wrapping means comprises tape.

10. An improved system for packaging parallel plate capacitive devices as recited in claim 9 wherein said tape is thermally insulative whereby said capacitive device may be mounted directly to an assembly in leadless fashion.

11. An improved system for packaging a parallel plate capacitive device as recited in claim 10 wherein said electrical connection means comprises a porous metal coating applied to said first edge and to said second edge and electrical lead means for facilitating electrical connection to said first and second groups of metallic layers, said lead means being attached to said porous metal coating by a plasma fusion process providing tenacula of metal fibers embedded within said porous metal coating and fushed to said lead means, thereby providing an extremely strong bond between said lead means and said capacitive device.

12. An improved system for packaging a parallel plate capacitive device as recited in claim 11 wherein said improved system further comprises sealing means, said sealing means being introduced within the capacitive device to displace fluid contaminants from the device, introduced between the device and said wrapping means, and introduced upon exposed surfaces of the capacitive device to seal the device from incursions by humidity and other contaminants.

13. A method of attaching leads to a porous metal material comprising the steps of:

(a) electrically contacting the porous metal material with a first terminal means for applying an electrical potential to the porous metal material;
(b) suspending adjacent the porous metal material a second terminal means for applying an electrical potential to the porous metal material;
(c) applying an electrical potential across said first terminal means and said second terminal means; and
(d) applying a driving force to said second terminal means sufficient to impact and continue to press against the porous metal material sufficiently to complete an electrical circuit between said first terminal means and said second terminal means through the porous metal material.

14. A method of attaching leads to a porous metal material as recited in claim 13 wherein said electrical potential and said driving force are sufficient to create a plasma of said porous metal material adjacent said second terminal means and to fuse said second terminal means with the porous metal material upon said impact and during at least a part of said pressing of said second terminal means against said porous metal material.

15. A method of attaching leads to a porous metal material as recited in claim 14 wherein said method further comprises the step of severing said second terminal means at a distance from the porous metal material to form an electrical lead.

16. A system for packaging a parallel plate metallized dielectric film capacitive device having a plurality of layers of capacitive strata with alternating layers of metallized dielectric film electrically connected in common respectively at a first edge and at a second edge by an electrically conductive material, said system comprising a wrapping means for protecting the device yet allowing electrical access to said electrically conductive material, electrical lead means for electrically accessing said electrically conductive material, and contaminant displacement means for displacing contaminants from the device and resisting re-entry of contaminants into the device; said wrapping means being configured and applied to provide lateral support to the device sufficient to enhance ability of the device to resist delamination; said electrically conductive material being a porous metal coating applied to said first edge and said second edge, said electrical lead means being attached to said porous metal coating by fusing in a manner providing tenacula of metal fibers embedded within said porous metal coating, thereby providing an extremely strong bond between said lead means and the device.

17. A method of packaging a metallized film parallel plate capacitor having alternate plates electrically connected in common at a first edge and remaining alternate plates electrically connected in common at a second edge by an electrically conductive material, said method comprising the steps of:

(a) applying wrapping means for protecting the capacitor from physical and contaminative damage in a manner leaving said first edge and said second edge accessible for further processing; said wrapping means being sufficiently tightly applied to the capacitor to laterally support said parallel plates and thereby increase the capacitor's resistance to delamination;
(b) attaching electrical lead means for facilitating electrical connection to the capacitor by percussive fusion of said lead means to said electrically conductive material; and (c) sealing the capacitor to preclude incursion of contaminants.

18. A method of packaging a metallized film parallel plate capacitor as recited in claim 17 wherein said protective means comprises adhesive tape 19. A method of packaging a metallized film parallel plate capacitor as recited in claim 18 wherein said electrically conductive material comprises single-metal porous metal material and said attaching of electrical lead means further comprises, for each of said electrical leads, the steps of:

(a) contacting said porous metal material with a first terminal means for applying an electrical potential to the porous metal material; (b) suspending adjacent the porous metal material a second terminal means for applying an electrical potential to the porous metal material;

(c) applying an electrical potential across said first terminal means and said second terminal means; and (d) driving said second terminal means toward the capacitor with sufficient force to cause said second terminal means to impact and continue to press against the porous metal material and to complete an electrical circuit between said first terminal means and said second terminal means through the porous metal material, thereby creating a plasma of the porous metal material in the vicinity of said second terminal means, fusing said second terminal means to said porous metal material, and creating tenacula of metal fibers embedded within said porous metal material.

20. A method of packaging a metallized film parallel plate capacitor as recited in claim 19 wherein said sealing comprises impregnation of the capacitor with a sealant to displace fluid contaminants from between said wrapping means and the capacitor and from the interstices of the capacitor and to inhibit subsequent incursion of contaminants into the capacitor.

21. A method as recited in claim 20 wherein said film is dielectric film of polyester, polycarbonate or polypropylene, and said sealant is wax.

22. A method of packaging a metallized film parallel plate capacitor as recited in claim 19 wherein said single-metal porous metal material is porous aluminum material.

23. A method of packaging a metallized film parallel plate capacitor as recited in claim 17 wherein said protective means comprises heat shrinkable material applied in encircling relation with respect to the capacitor and then subjected to heat to form a sleeve about the capacitor, said sleeve conforming to the shape of the capacitor and laterally supporting the parallel plates, thereby increasing the capacitor's resistance to delamination.

24. A method of packaging a metallized film parallel plate capacitor as recited in claim 23 wherein said electrically conductive material comprises single-metal porous metal material and said attaching of electrical lead means further comprises for each of said electrical leads, the steps of:

(a) contacting said porous metal material with a first terminal means for applying an electrical potential to the porous metal material;

(b) suspending adjacent the porous metal material a second terminal means for applying an electrical potential to the porous metal material;

(c) applying an electrical potential across said first terminal means and said second terminal means; and (d) driving said second terminal means toward the capacitor with sufficient force to cause said second terminal means to impact and continue to press against the porous metal material and to complete an electrical circuit between said first terminal means and said second terminal means through the porous metal material, thereby creating a plasma of the porous metal material in the vicinity of said second terminal means, fusing said second terminal means to said porous metal material, and creating tenacula of metal fibers embedded within said porous metal material.

25. A method of packaging a metallized film parallel plate capacitor as recited in claim 24 wherein said sealing comprises impregnation of the capacitor with a sealant to displace fluid contaminants from between said wrapping means and the capacitor and from the interstices of the capacitor and to inhibit subsequent incursion of contaminants into the capacitor.

26. A method as recited in claim 25 wherein said film is dielectric film of polyester, polycarbonate or polypropylene, and said sealant is wax .

27. A method of packaging a metallized film parallel plate capacitor as recited in claim 24 wherein said single-metal porous metal material is porous aluminum material.

28. A capacitive device formed in a solid shape having a length defined by a first end and a second end, a width defined by a first edge and a second edge and a height defined by a top and a bottom, said capacitive device comprising a plurality of strata of capacitive structure, a protective means and electrical connection means; said plurality of strata of capacitive structure comprising a plurality of layers of dielectric film each of said plurality of layers of dielectric material having affixed thereto a metallic film, said plurality of layers being disposed with said metallic film of each layer being separated by dielectric material from said metallic film of an adjacent layer, each of said plurality of layers having metal film extending substantially from said first end to said second end and having said metal film electrically discontinuous at a discontinuity between said first edge and said second edge; said protective means comprising wrapping means covering said top, said first end, said bottom and said second end; said electrical connection means comprising an electrically conductive coating applied to said first edge and said second edge to electrically connect said metallic films of each of said plurality of layers; a first group of said plurality of layers has said discontinuity located at a first distance from said first edge and a second group of said plurality of layers has said discontinuity located at a second distance from said first edge, said first distance and said second distance being unequal; layers of said first group alternating with layers of said second group; said electrically conductive coating comprises a porous metal coating and said electrical connection means further comprises electrical lead means attached to said porous metal coating in a manner providing tenacula of metal fibers embedded within said porous metal coating and fused to said lead means, thereby providing an extremely strong bond between said lead means and the device.

29. A capacitive device as recited in claim 28 wherein said wrapping means comprises tape, said tape being applied sufficiently tightly to provide electrical and environmental protection for the device as well as to mechanically enchance the device, thereby increasing capability of the device to resist delamination.

30. A capacitive device as recited in claim 29 wherein said protective means further comprises sealing means, said sealing means being introduced within the device to displace fluid contaminants from the device, introduced between the device and said tape, and introduced upon exposed surfaces of the device to seal the device against incursions by humidity or other contaminants.

31. A capacitive device as recited in claim 28 wherein said wrapping means comprises a heat shrinkable material applied in encircling relation with respect to the device and subjected to heat to form a sleeve about the device conforming to the shape of the device.

32. A capacitive device as recited in claim 31 wherein said protective means further comprises sealing means, said sealing means being introduced within the device to displace fluid contaminants from the device, introduced between the device and said heat shrinkable material, and introduced upon exposed surfaces of the device to seal the device against incursions by humidity or other contaminants.

33. An improved system for packaging parallel plate capacitive devices having a length defined by a first end and a second end, a height defined by a top and a bottom and a width defined by a first edge and a second edge, said capacitive devices further having a plurality of strata of capacitive structures formed by alternating layers of dielectric material carrying metallic material thereon with successive layers of metallic material separated by dielectric material, each layer of metallic material being electrically continuous substantially from said first end to said second end, a first group of said metallic layers being electrically continuous substantially from said first edge to a first discontinuity displaced from said second edge, and a second group of said metallic layers being electrically continuous substantially from said second edge to a second discontinuity displaced from said first edge, said first group alternating with said second group; the improvement comprising wrapping means for protecting said top, said first end, said bottom and said second end; electrical connection means for providing electrical connection to said first group of metallic layers at said first edge and separate electrical connection to said second group of metallic layers at said second edge; and said electrical connection means comprises a porous metal coating applied to said first edge and to said second edge and electrical lead means for facilitating electrical connection to said first and second groups of metallic layers, said lead means being attached to said porous metal coating by a plasma fusion process providing tenacula of metal fibers embedded within said porous metal coating and fused to said lead means, thereby providing an extremely strong bond between said lead means and said capacitive device.

34. An improved system for packaging parallel plate capacitive devices as recited in claim 33 wherein said wrapping means comprises tape, said tape being applied sufficiently tightly to provide environmental and electrical protection for the device as well as to mechanically enhance the device thereby increasing capability of the device to resist delamination.

35. An improved system for packaging a parallel plate capacitive device as recited in claim 34 wherein said improved system further comprises sealing means, said sealing means being introduced within the capacitive device to displace fluid contaminants from the device, introduced between the device and said wrapping means, and introduced upon exposed surfaces of the capacitive device to seal the device from incursions by humidity and other contaminants.

36. An improved system for packaging parallel plate capacitive devices as recited in claim 33 wherein said wrapping means is heat shrinkable material applied in encircling relation with respect to the device and subjected to heat to form a sleeve about the device conforming to the shape of the device.

37. An improved system for packaging a parallel plate capacitive device as recited in claim 36 wherein said improved system further comprises sealing means, said sealing means being introduced within the capacitive device to displace fluid contaminants from the device, introduced between the device and said wrapping means, and introdced upon exposed surfaces of the capacitive device to seal the device from incursions by humidity and other contaminants.

38. A method of attaching leads to a porous metal material comprisingthe steps of:
(a) electrically contacting the porous metal material with a first terminal means for applying an electrical potential to the porous metal material;
(b) suspending adjacent the porous metal material a second terminal means for applying an electrical potential to the porous metal material;
(c) applying an electrical potential across said first terminal means and said second terminal means; and
(d) applying a driving force to said second terminal means sufficient to impact and continue to press against the porous metal material sufficiently to complete an electrical circuit between said first terminal means and said second terminal means through the porous metal material; said electrical potential and said driving force being sufficient to create a plasma of said porous metal material adjacent said second terminal means and to fuse said second terminal means with the porous metal material upon said impact and during at least a part of said pressing of said second terminal means against said porous metal material.

39. A method of attaching leads to porous metal material as recited in claim 38 wherein said method further comprises the step of severing said second terminal means at a distance from the porous metal material to form an electrical lead.

40. A method of packaging a metallized film parallel plate capacitor having alternate plates electrically connected in common at a first edge and remaining alternate plates electrically connected in common at a second edge by porous metal material, said method comprising the steps of:
(a) applying protective means for protecting the capacitor from physical and contaminative damage in a manner leaving said first edge and said second edge accessible for further processing;
(b) contacting said porous metal material with a first terminal means for applying an electrical potential to the porous metal material;

(c) suspending adjacent the porous metal material a second terminal means for applying an electrical potential to the porous metal material;

(d) applying an electrical potential across said first terminal means and said second terminal means; and (e) driving said second terminal means toward the capacitor with sufficient force to cause said second terminal means to impact and continue to press against the porous metal material and to complete an electrical circuit between said first terminal means and said second terminal means through the porous metal material, thereby creating a plasma of the porous metal material in the vicinity of said second terminal means, fusing said second terminal means to said porous metal material, and creating tenacula of metal fibers embedded within said porous metal material.

41. A method of packaging a metallized film parallel plate capacitor as recited in claim 40 wherein said protective means comprises adhesive tape, said tape being sufficiently tightly applied to the capacitor to laterally support the parallel plates and thereby increase the capacitor's resistance to delamination.

42. A method of packaging a metallized film parallel plate capacitor as recited in claim 41 wherein said method further comprises sealing the capacitor by impregnation of the capacitor with a sealant to displace fluid contaminants from between said wrapping means and the capacitor and from the interstices of the capacitor and to inhibit subsequent incursion of contaminants into the capacitor.

43. A method of packaging a metallized film parallel plate capacitor as recited in claim 40 wherein said protective means comprises heat shrinkable material applied in encircling relation with respect to the capacitor and then subjected to heat to form a sleeve about the capacitor, said sleeve conforming to the shape of the capacitor and laterally supporting the parallel plates, thereby increasing the capacitor's resistance to delamination.

44. A method of packaging a metallized film parallel plate capacitor as recited in claim 43 wherein said method further comprises sealing the capacitor by impregnation of the capacitor with a sealant to displace fluid contaminants from between said wrapping means and the capacitor and from the interstices of the capacitor and to inhibit subsequent incursion of contaminants into the capacitor.

* * * * *